(12) United States Patent
Li et al.

(10) Patent No.: US 11,408,553 B2
(45) Date of Patent: Aug. 9, 2022

(54) TRIPOD STAND HEAD MOUNT

(71) Applicant: GUANGDONG SIRUI OPTICAL CO., LTD., Zhongshan (CN)

(72) Inventors: Jie Li, Zhongshan (CN); Xiangyu Huang, Zhongshan (CN)

(73) Assignee: GUANGDONG SIRUI OPTICAL CO., LTD., Zhongshan (CN)

( * ) Notice: Subject to any disclaimer, the term of this patent is extended or adjusted under 35 U.S.C. 154(b) by 0 days.

(21) Appl. No.: 16/478,048

(22) PCT Filed: May 7, 2018

(86) PCT No.: PCT/CN2018/085834
§ 371 (c)(1),
(2) Date: Jul. 16, 2019

(87) PCT Pub. No.: WO2019/205184
PCT Pub. Date: Oct. 31, 2019

(65) Prior Publication Data
US 2021/0332937 A1 Oct. 28, 2021

(30) Foreign Application Priority Data
Apr. 27, 2018 (CN) .......................... 201810390808.3

(51) Int. Cl.
*F16M 11/16* (2006.01)
*F16M 11/34* (2006.01)
*G03B 17/56* (2021.01)

(52) U.S. Cl.
CPC ............. *F16M 11/16* (2013.01); *F16M 11/34* (2013.01); *G03B 17/561* (2013.01)

(58) Field of Classification Search
CPC ........ F16M 11/16; F16M 11/34; F16M 11/02; F16M 11/06; F16M 11/12; F16M 11/121;
(Continued)

(56) References Cited

U.S. PATENT DOCUMENTS 1,919,554 A * 7/1933 Howell .............. F16M 11/2014
248/183.3
2,145,584 A * 1/1939 Chamberlain, Jr. . F16M 11/048
248/184.1
(Continued)

FOREIGN PATENT DOCUMENTS

CN 203963406 * 11/2014 ............. F16M 11/04

*Primary Examiner* — Christopher Garft
(74) *Attorney, Agent, or Firm* — Loeb & Loeb LLP

(57) ABSTRACT

A head mount includes a seat body on which a mounting cavity is provided; a conversion structure, and having two connection ends of different specifications; the conversion structure is reversibly disposed in the installation cavity, and the selected connection end protrudes out of the installation cavity by flipping the conversion structure, and is adapted to The photographing device is connected, and the seat body has a limiting structure for preventing the switching mechanism from being turned over after the photographing device is connected to the connecting end. By setting the conversion structure, when it is necessary to connect with the shooting device of different interfaces, the required connection end may be flipped outside the installation cavity to connect with the corresponding shooting device as required. The invention may realize the conversion of different connection ends by simply flipping the conversion structure, thereby realizing the connection with the different interface photographing devices, the operation is simple and quick, and the connection end is not required to be disassembled, and the connection end is not easily lost.

18 Claims, 6 Drawing Sheets

(58) Field of Classification Search
CPC .. F16M 11/125; F16M 11/126; F16M 11/128; G03B 17/561
USPC .......................................... 248/187.1, 177.1
See application file for complete search history.

(56) References Cited

U.S. PATENT DOCUMENTS

| | | | | |
|---|---|---|---|---|
| 2,166,258 A * | 7/1939 | Matrat | ............... | F16M 11/16 248/188 |
| 3,782,671 A * | 1/1974 | Igwe | ............... | F16M 11/18 396/419 |
| 6,739,559 B2 * | 5/2004 | Nakatani | ............... | F16M 11/24 396/419 |
| 7,494,290 B2 * | 2/2009 | Kim | ............... | G03B 17/02 396/419 |
| 7,658,556 B2 * | 2/2010 | Johnson | ............... | G03B 17/566 396/428 |
| 8,418,973 B2 * | 4/2013 | Liu | ............... | F16M 11/2035 248/176.1 |
| 8,628,258 B2 * | 1/2014 | Vogt | ............... | F16M 11/2021 396/428 |
| 8,794,853 B2 * | 8/2014 | Piccoli | ............... | F16M 11/2014 396/428 |
| 8,998,513 B2 * | 4/2015 | Li | ............... | F16M 11/22 396/428 |
| 9,360,743 B2 * | 6/2016 | Battaglia | ............... | F16M 11/2014 |
| 9,726,963 B1 * | 8/2017 | Xiao | ............... | G03B 17/566 |
| 2003/0012571 A1 * | 1/2003 | Nakatani | ............... | F16M 11/10 396/428 |
| 2004/0061035 A1 * | 4/2004 | Nakatani | ............... | F16M 11/24 248/278.1 |
| 2004/0159754 A1 * | 8/2004 | Ku | ............... | F16M 11/2064 248/187.1 |
| 2011/0006170 A1 * | 1/2011 | Liu | ............... | F16M 11/041 248/371 |
| 2012/0235014 A1 * | 9/2012 | Li | ............... | F16M 11/14 248/636 |
| 2013/0051783 A1 * | 2/2013 | Piccoli | ............... | F16M 11/10 396/428 |
| 2013/0108255 A1 * | 5/2013 | Vogt | ............... | F16M 11/105 396/428 |
| 2015/0003820 A1 * | 1/2015 | Li | ............... | F16M 11/08 396/428 |
| 2015/0358523 A1 * | 12/2015 | Mohr | ............... | F16M 11/04 348/208.7 |
| 2015/0370148 A1 * | 12/2015 | Battaglia | ............... | F16M 11/12 396/428 |
| 2016/0061377 A1 * | 3/2016 | Nakatani | ............... | F16M 11/242 248/184.1 |
| 2016/0139494 A1 * | 5/2016 | Tien | ............... | G03B 17/561 396/428 |
| 2017/0123297 A1 * | 5/2017 | Speggiorin | ............... | F16M 11/242 |
| 2017/0350552 A1 * | 12/2017 | James | ............... | F16M 11/041 |
| 2018/0299061 A1 * | 10/2018 | Neundorf | ............... | F16M 11/041 |
| 2018/0324360 A1 * | 11/2018 | Gabrielli | ............... | F16M 11/28 |
| 2019/0236919 A1 * | 8/2019 | Mehdi | ............... | F16M 13/02 |
| 2019/0271902 A1 * | 9/2019 | Chan | ............... | F16M 11/10 |
| 2020/0272031 A1 * | 8/2020 | Zhu | ............... | F16M 11/16 |

* cited by examiner

FIG. 1
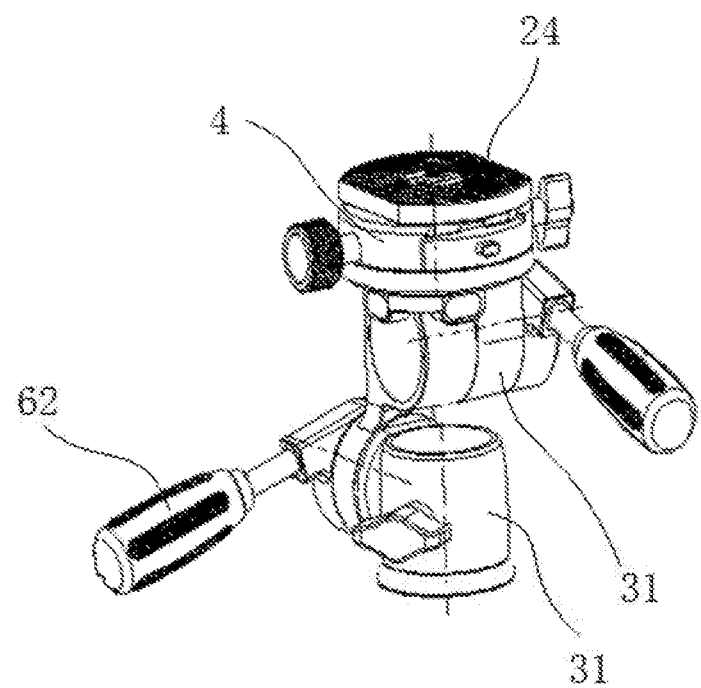
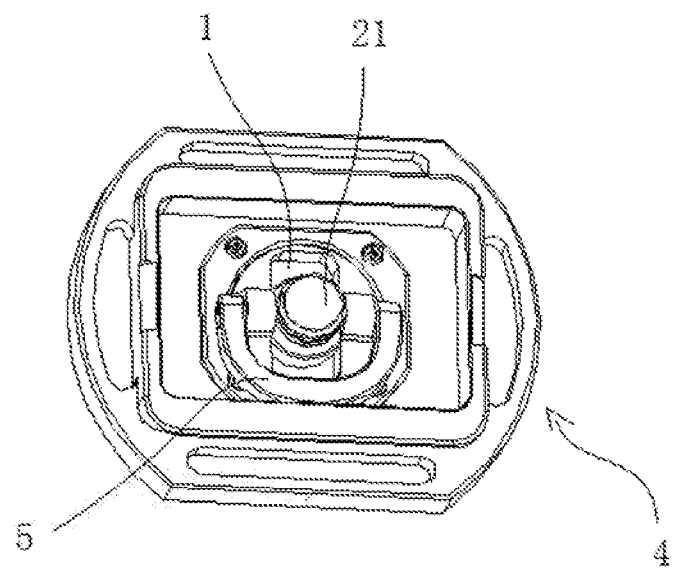
FIG. 2

FIG. 5
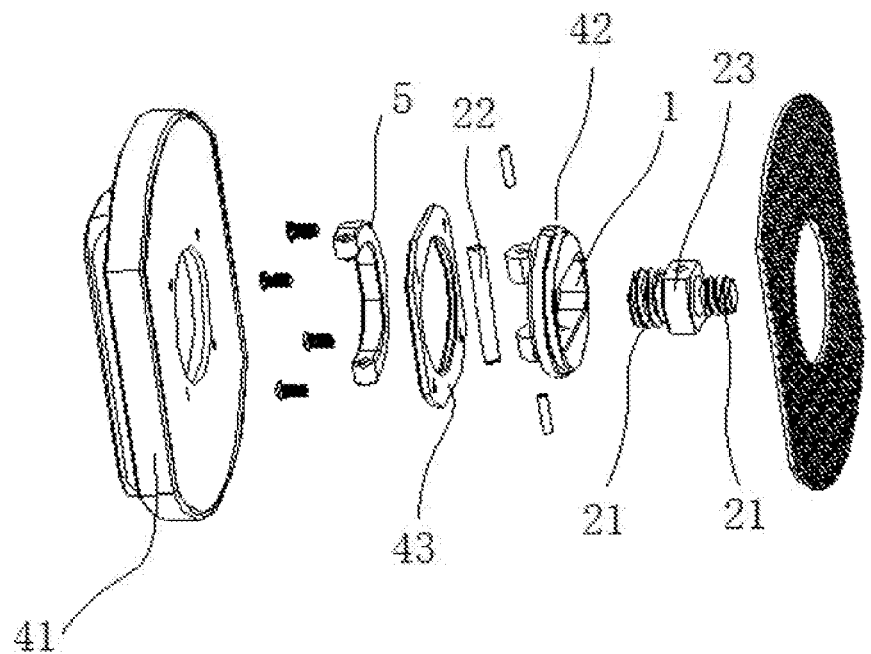
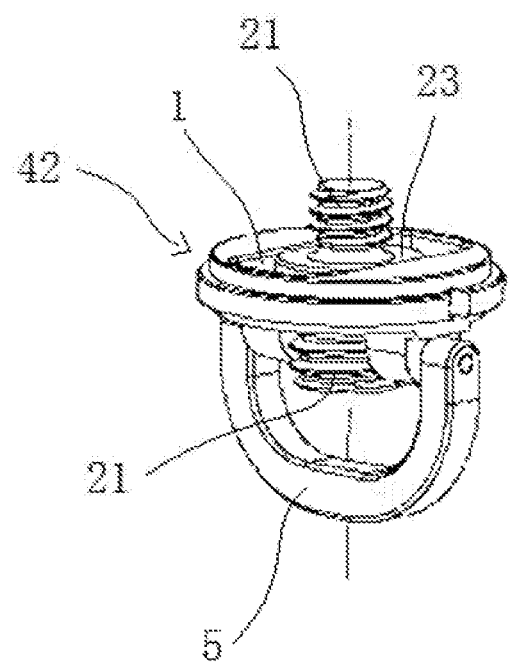
FIG. 6

TRIPOD STAND HEAD MOUNT

CROSS-REFERENCE TO RELATED APPLICATIONS

This is a national stage application of PCT application serial number PCT/CN2018/085834, filed on May 7, 2018, which claims priority to a Chinese patent application, application number 201810390808.3, filed on Apr. 27, 2018, whose applications are incorporated by reference in their entirety herein.

TECHNICAL FIELD

Aspects of the invention are generally related to fields of photographic equipment technology. Specifically, embodiments of the invention are related to head of photographic stands, tripods, or monopods.

BACKGROUND

A tripod or monopod head, hereinafter simplified as "head mount," is a supporting device for mounting and fixing a shooting device (such as a camera or a camera). Usually, the head mount is mounted on a bracket (usually a tripod), and then the photographing device is mounted on the head mount, so that the photographing device may be adjusted to an angle to achieve the desired work posture.

At present, most of the shooting equipment on the market (such as cameras, lenses, etc.) are designed with ⅜ UNC or ¼ UNC nut connection fixed interfaces, and their matching equipment (such as a tripod) should also be designed with ⅜ and the ¼ screws. In the prior art, the above two different screws are usually supplied as accessories to the consumer, so that the consumer may disassemble the device according to the interface specification of the camera or the lens of the camera (such as a head mount). The screws on the tripod are so inconvenient to use and it is easy to lose these two different sizes of bulk screws.

SUMMARY

Therefore, the technical problem to be solved by the aspects of the invention is to overcome the defects that the different specifications of the screw connected to the lens and the lens in the prior art need to be disassembled and assembled, and the replacement is inconvenient and easy to be lost, thereby providing a connection with the lens. The screws of different specifications do not need to be disassembled and installed, and the head mount is easy to replace and not easy to lose.

Aspects of the invention provide a tripod or monopod head (hereinafter "head mount" for short) comprising:

a seat body having a mounting cavity thereon; a conversion structure having at least two connection ends of different specifications; the conversion structure being reversible and provided in the mounting cavity, the selected connecting end protrudes out of the mounting cavity by flipping the conversion structure, is adapted to be connected to the photographing device, and the seat has the connecting end after the shooting device is connected, the limiting structure that prevents the switching mechanism from being turned over is blocked.

The limiting structure is a limiting end surface on the seat body, and the mounting cavity is formed on the limiting end surface, and the limiting end surface is opposite to the bottom of the photographing device to prevent the switching mechanism from being turned over.

The connecting end is a screw end.

The two connecting ends of the conversion structure are respectively a ⅜ UNC screw end and a ¼ UNC screw end.

The conversion structure is hinged within the mounting cavity. The wall of the cavity of the mounting cavity has oppositely disposed restricted openings, and the conversion structure further comprises: an articulated shaft, wherein the two ends are respectively inserted into the corresponding restricted openings; the rotating shaft body is fixed on both sides thereof Two connecting ends; the rotating shaft body is provided with a shelter A hinge hole through which the hinge shaft passes and which may rotate the shaft body about the hinge shaft. The outer diameter of the hinge shaft is interference-fitted with the aperture of the restricted opening. The seat body includes:

a base adapted to be coupled to the bracket; a quick-loading plate assembly mounted on the base, and the mounting cavity being mounted away from the base on one end.

The quick release plate assembly includes:

a quick loading plate, comprising a plate-shaped body, and a protruding arm extending from the plate-shaped body away from the photographing device; the plate-shaped body is provided with a first receiving cavity, the protruding arm Forming a second receiving cavity communicating with the first receiving cavity with the plate-shaped body;

The fixing base includes an inserting portion installed in the first accommodating cavity, and is provided with the mounting cavity; a cover plate is disposed in the second accommodating cavity and detachably connected to the plate-shaped body, said one side of the photographing device is opposed to a side of the embedding portion remote from the photographing device to prevent the embedding portion from coming out of the first receiving chamber in a direction away from the photographing device.

The outer diameter of the first receiving cavity near one end of the photographing device is smaller than the outer diameter away from the end of the photographing device, and the outer peripheral wall shape of the embedding portion matches the cavity wall of the first receiving cavity.

The fixing base further includes a protruding portion fixedly connected to the embedded portion and extending into the second receiving cavity, the head mount further comprising a connecting portion for driving the protruding portion And an adjustment handle of the conversion structure about an axis extending from the connecting end of the mounting cavity.

The adjustment handle is hinged to the extension portion, and the adjustment handle has an unfolded state in which the plane lies parallel to the axial direction of the connection end, and a storage state in which the plane lies perpendicular to the axial direction of the connection end.

The base is a multi-dimensional adjustment seat for adjusting an installation angle of the photographing device on the head mount.

The multi-dimensional adjustment seat includes at least two rotating seats, and the rotating seats is rotatably connected by the rotating shaft and the number of the rotating shafts is greater than 1, the rotating shafts are not arranged in parallel;

The head mount further includes a first locking structure disposed between the two adjacent rotating seats for locking the two adjacent rotating seats at an adjusted angle.

The first locking structure includes: a locking assembly disposed on one of the at least two rotating seats of the adjacent rotating seats, for locking the rotating shaft to prevent rotation between two adjacent rotating seats; locking a handle engaged with the locking assembly for controlling the locking assembly to lock the rotating shaft, or releasing the pair The locking of the rotating shaft. The first locking structure is rotatably disposed about the rotating shaft; the head mount further includes rotating the first locking structure about the rotating shaft until the locking handle is in a vertical state, and rotating about the rotating shaft to a second locking structure that is locked when in the working state.

The second locking structure includes: an curved groove disposed at an end of the rotating seat provided with the locking assembly toward the locking assembly a first position and a second position; a positioning hole is disposed on the end surface of the locking assembly facing the corresponding arc groove; an elastic member is mounted in the positioning hole; a member that is opposite to one end of the elastic member and may be engaged by the elastic member or pulling out the first position and the second position, the adjustment member is engaged in the first position when the first locking structure is in a vertical state, when the first locking structure is in an operating state In the second position.

The first position and the second position are respectively locking holes formed by the groove bottom of the curved groove.

One of the rotating seats of the two mating seats is formed with a through hole, and the other of the rotating seats is provided with the rotating shaft adapted to pass through the through hole; the locking assembly is rotatable The rotating seats is connected to the through hole, and the locking assembly is provided with a mounting hole that may be fitted on the rotating shaft.

The locking assembly further includes an opening sleeve sleeved on the rotating shaft, and is disposed in the mounting hole, and the two sides of the opening of the opening sleeve extend outwardly from the first adjustment arm and the second adjusting arm. The first locking structure further includes a shaft connecting the locking assembly and the locking handle; the locking assembly is provided with a threaded connection, and the corresponding end of the shaft is provided with the thread. An external threaded structure includes a matching hole; and the shaft is pushed against the first adjustable arm toward the second adjustable arm when the screwing hole is screwed or unscrewed. The opening is narrowed toward or away from the second adjustment arm with the first adjustable arm gradually enlarges the opening.

Also included is an elastic bushing disposed between the rotating shaft and the split bushing, the resilient bushing locking the rotating shaft when the opening of the split bushing contracts.

The technical solution of the aspects of the invention has the following advantages:

1. The head mount provided by the aspects of the invention comprises: a seat body having a mounting cavity thereon; a conversion structure having at least two connection ends of different specifications; the conversion structure may be flipped provided in the mounting cavity, the selected connecting end protrudes out of the mounting cavity by flipping the conversion structure, is adapted to be connected to the photographing device, and the seat has the connecting end after the shooting device is connected, the limiting structure that prevents the switching mechanism from being turned over is blocked. By setting the conversion structure, when it is necessary to connect with the shooting device of different interfaces, the required connection end may be turned over to the outside of the installation cavity to connect with the corresponding shooting device as required. Aspects of the invention may realize the conversion of different connection ends by simply flipping the conversion structure, thereby realizing the connection with the different interface photographing devices, the operation is simple and quick, and the connection end is not required to be disassembled, and the connection end is not easily lost.

2. The head mount provided by the aspects of the invention includes: a cavity wall of the mounting cavity has oppositely disposed restricted openings, and the conversion structure further comprises: an hinge shaft, wherein the two ends are respectively inserted into the corresponding restricted openings; The rotating shaft body has two connecting ends fixed on two sides thereof; the rotating shaft body is provided with a hinge hole through which the hinge shaft passes and may rotate the rotating shaft body around the hinge shaft. By arranging the two connecting ends on the two ends of the rotating shaft body and providing the hinge hole on the rotating shaft body, the rotation of the rotating shaft body around the hinge shaft may realize the conversion between the two connecting ends, and the structure is simple and the operation is convenient.

3. The head mount provided by the aspects of the invention includes: a quick-loading plate assembly comprises: a quick-release plate, comprising a plate-shaped body, and a projecting arm extending from the plate-shaped body away from the photographing device; a first accommodating cavity is formed on the plate-shaped body, and a second accommodating cavity is formed between the protruding arm and the plate-shaped body to communicate with the first accommodating cavity; the fixing base includes the mounting An embedding portion of the first accommodating cavity, and the mounting cavity is disposed, and the cover plate is disposed in the second accommodating cavity, and is detachably connected to a side of the plate-shaped body away from the photographing device, And abutting the side of the embedding portion away from the photographing device to prevent the embedding portion from coming out of the first receiving cavity in a direction away from the photographing device. By installing the mounting cavity in the fixing seat and by the cooperation of the quick loading plate and the cover plate, the fixing seat provided with the mounting cavity may be stably mounted on the quick loading plate, thereby making the installation of the conversion structure in the installation cavity smoother.

4. The head mount provided by the aspects of the invention includes: a fixing base further includes a protruding portion fixedly connected to the embedded portion and extending into the second accommodating cavity, wherein the head mount further comprises a connection And an adjustment handle that may rotate the protrusion and the conversion structure around an axis extending from the connecting end of the mounting cavity. When the connection end needs to be connected to the photographing device, the knob may be rotated to adjust the screw connection between the connection end and the photographing device, so that the connection between the head mount and the photographing device is more convenient.

5. The head mount provided by the aspects of the invention includes: an adjusting handle is hinged to the protruding portion, the adjusting handle has an unfolded state in which the plane is parallel to the axial direction of the connecting end, and a plane is connected with the plane The axially vertical storage state of the end. Thus, when the adjustment handle is required, the adjustment handle is placed in the unfolded state, and when the adjustment handle is not required, the adjustment handle is placed in a state of being accommodated, thereby facilitating storage.

6. The head mount provided by the aspects of the invention includes: a first locking structure is rotatably disposed about the rotating shaft; the head mount further includes rotating the first locking structure about the rotating shaft to the lock The second locking structure is locked when the handle is in the upright state and is rotated about the rotating shaft to the working state. By the arrangement of the second locking structure, the locking handle may be switched and locked between the vertical state and the working state, thereby facilitating the use of the locking handle and facilitating storage when not in use, reducing the head mount take up space.

7. The head mount provided by the aspects of the invention includes: a second locking structure which further includes: an curved groove disposed on an end surface of the rotating seats facing the locking assembly, and is provided with a first position and a second position a positioning hole disposed on an end surface of the locking assembly facing the rotating seat; an elastic member installed in the positioning hole; an adjustment member abutting against one end of the elastic member and being at the elastic member Actuating or disengaging the first position and the second position, the adjustment member is engaged in the first position when the first locking structure is in a vertical state, in the first locking The second position is when the structure is in operation. By switching the adjustment member between the first position and the second position, the locking handle may be switched between the vertical state and the working state. The manner of switching the state of the locking handle is simple in structure and convenient in operation.

8. The head mount provided by the aspects of the invention includes: a locking assembly further includes an open sleeve sleeved on the rotating shaft, and is disposed in the mounting hole, and the two sides of the opening of the opening sleeve extend outwardly a first adjustment arm and a second adjustment arm; the first locking structure further includes a shaft connecting the locking assembly and the locking handle; the locking assembly is provided with a threaded connection, a corresponding end of the shaft is provided with an external thread structure engaged with the threaded connection; the shaft is pushed against the first adjusting arm to the second tone when screwing or unscrewing the threaded connection The opening of the mouth is gradually enlarged by narrowing the opening or away from the first adjustment arm. By rotating the shaft, the opening of the opening sleeve may be adjusted, and the opening sleeve may be rotated or hug relative to the rotating shaft, so that the angle between the rotating seat may be adjusted when the opening sleeve is rotated relative to the rotating shaft. The state of the lock handle is switched and the adjusted angle or state is locked when the open sleeve holds the rotary shaft.

BRIEF DESCRIPTION OF THE DRAWINGS

In order to more clearly illustrate the specific embodiments of the aspects of the invention or the technical solutions in the prior art, the drawings used in the specific embodiments or the description of the prior art will be briefly described below, and obviously, the attached in the following description The drawings are some embodiments of the aspects of the invention, and those skilled in the art may obtain other drawings based on these drawings without any creative work.

FIG. 1 is a perspective view of a head mount provided in a first embodiment of the aspects of the invention;

FIG. 2 is a perspective view showing the conversion structure of the head mount shown in FIG. 1 mounted on the quick-loading plate assembly;

FIG. 5 is a perspective exploded view showing the conversion structure of the head mount shown in FIG. 2 mounted on the quick-loading plate assembly;

FIG. 6 is a schematic perspective view showing the conversion structure of the head mount shown in FIG. 1 mounted on a fixed seat;

DETAILED DESCRIPTION

Figure 3:
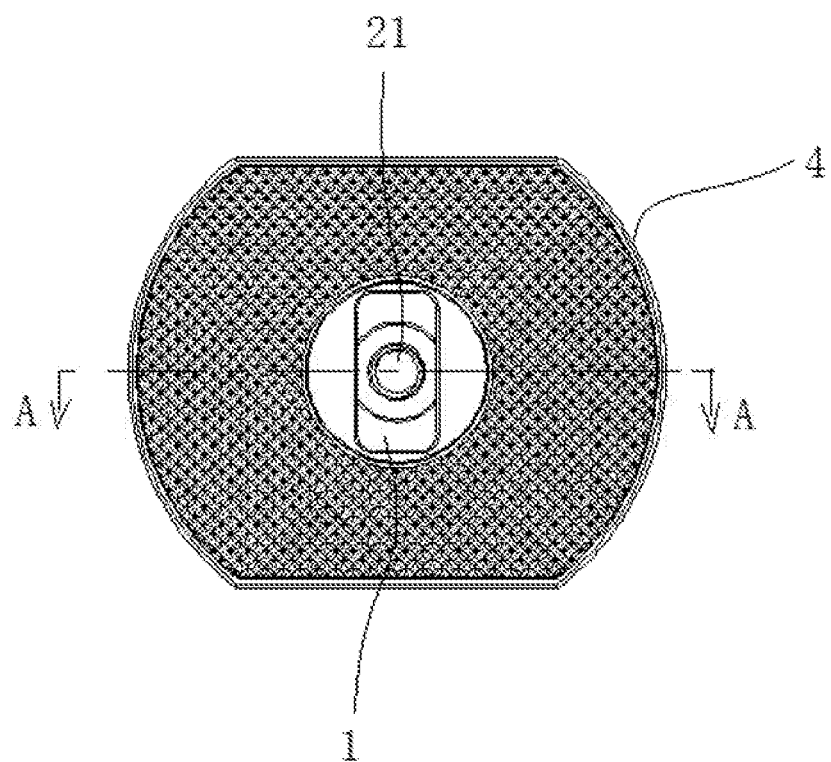
FIG. 3 is a top plan view showing the conversion structure of the head mount shown in FIG. 2 mounted on the quick-loading plate assembly.

Descriptions of the reference numbers are below:
1—mounting cavity, 11—restricted opening, 21—connecting end, 22—hinging shaft, 23—spindle body, 24—limit end face, 31—rotating seat, 32—rotating shaft, 4—fast mounting plate assembly, 41—quick release plate, 411—plate body, 412—extension arm, 413—first accommodation cavity, 414—second accommodation cavity, 42—fixed seat, 421—embedded portion, 422—extension, 43—cover, 5—adjustment handle, 61—locking assembly, 611—opening sleeve, 612—first adjustment arm, 613—second adjustment arm, 62—locking handle, 63—axis, 71—curved groove, 711—first position, 712—second position, 72—elastic member, 73—adjustment member, 8—elastic sleeve.

The technical solutions of the aspects of the invention will be clearly and completely described in the following with reference to the accompanying drawings. It is obvious that the described embodiments are a part of the embodiments of the invention, and not all of the embodiments. All other embodiments obtained by a person of ordinary skill in the art based on the embodiments of the invention without departing from the inventive scope are the scope of aspects of the invention.

Further, the technical features involved in the different embodiments of aspects of the invention described below may be combined with each other as long as they do not constitute a conflict therebetween.

As shown in FIG. 1 to FIG. 4, the embodiment provides a head mount, including a seat body and a conversion structure. A mounting cavity 1 is provided on the seat body.

The conversion structure has two connection ends 21 of different specifications; the conversion structure is reversibly mounted on the installation in the cavity 1, the selected connecting end 21 is extended beyond the mounting cavity 1 by flipping the conversion structure, suitable for shooting.

The camera (such as a camera, a camera, etc.) is connected, and the body has a limit structure that prevents the switching mechanism from flipping after the connection device is connected to the connection end 21. As a switchable embodiment, the conversion structure may also have three or four different types of connection terminals 21 of different specifications.

The limiting structure is a limiting end face 24 on the seat body, and the mounting cavity 1 is formed on the limiting end face 24.

The over-limit end face 24 is against the bottom of the camera and prevents the switching mechanism from flipping. In this embodiment, the connecting end 21 is a screw end and is respectively a ⅜ UNC screw end, and ¼ UNC screw end.

The specific structure of the conversion structure may come in various forms. In this embodiment, the conversion structure is hinged in the installation cavity 1, and the cavity wall of the installation cavity 1 has oppositely disposed restricted openings.

The hinge shaft 22 and the shaft body 23 are included. The hinge shaft 22 is respectively inserted into the corresponding restricted opening 11.

The shaft body 23 has two connecting ends 21 fixed on two sides thereof, and the rotating shaft body 23 is provided with a hinge. The shaft 22 passes through a hinge hole that allows the spindle body 23 to rotate about the hinge shaft 22 by connecting the two. The two ends 21 are respectively disposed at two ends of the rotating shaft body 23, and the hinge holes are arranged on the rotating shaft body 23, so that only the rotating shaft body 23 is rotated around the hinge shaft 22 to realize the conversion between the two connecting ends 21, and the structure is simple and convenient to operate.

In order to prevent the hinge shaft 22 from rotating together under the driving of the shaft body 23, in this embodiment, the outer diameter of the hinge shaft 22 is interference-fitted with the aperture of the restricted opening 11. The seat body includes a base and a quick-loading plate assembly 4. The base is adapted to be coupled to the bracket.

Figure 4:
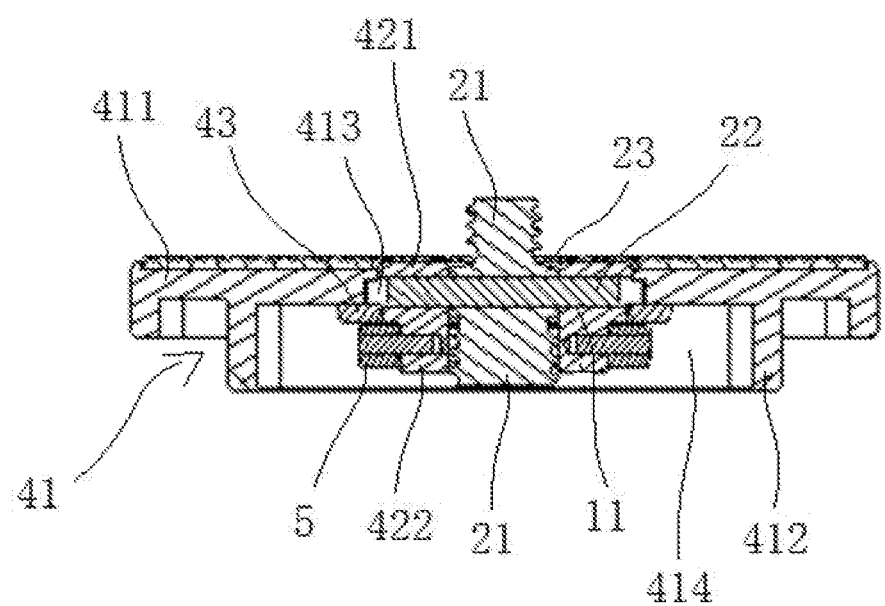
FIG. 4 is a cross-sectional view showing the conversion structure of the head mount shown in FIG. 2 mounted on the quick-loading plate assembly.

As shown in FIG. 4-6, the quick-loading plate assembly 4 is mounted on the base and at the end away from the base. There is a mounting cavity 1 on the top. The quick release plate assembly 4 includes a quick release plate 41, a fixing base 42 and a cover plate 43.

The quick loading plate 41 includes a plate-like body 411, and is oriented away from the photographing device by the plate-like body 411. An extending arm 412 is extended; a plate-shaped body 411 is provided with a first receiving cavity 413, and an extending arm 412 forms a second accommodating cavity 414 communicating with the first accommodating cavity 413 with the plate-shaped body 411.

The fixing base 42 includes an inserting portion 421 installed in the first accommodating cavity 413, and is provided with a mounting cavity 1.

The cover plate 43 is disposed in the second accommodating cavity 414, and is detachably connected to the plate-shaped body 411 away from shooting.

One side of the device and the side of the embedding portion 421 away from the photographing device to prevent the embedding portion 421.

The first receiving cavity 413 is disengaged away from the photographing device.

By arranging the mounting cavity 1 in the fixing seat 42 and by engaging the quick mounting plate 41 with the cover plate 43. The fixing seat 42 provided with the mounting cavity 1 may be stably mounted on the quick mounting plate 41, thereby enabling installation of the conversion structure in chamber 1 smoother.

The outer diameter of the first accommodating cavity 413 near the end of the photographing device is smaller than the outer end of the photographing device. The diameter of the outer peripheral wall of the insert portion 421 matches the wall of the first accommodating chamber 413. In order to make the connection operation between the head mount and the photographing device more convenient, the fixing seat 42, in this embodiment, further includes a protrusion 422 that is fixedly coupled to the embedded portion 421 and extends into the second housing cavity 414.

The head mount also includes a connecting portion 422, a movable extension portion 422, and a conversion structure extending around the adjustment handle 5 of the shaft rotation of the connection end 21 of the mounting chamber 1 is provided. When the connection end 21 needs to be connected to the photographing device, the adjustment handle 5 may be rotated to adjust the screw connection between the connection end 21 and the photographing device, thereby making the connection operation between the head mount and the photographing device more complete.

In this embodiment, the adjustment handle 5 is hinged to the extension 422, and the adjustment handle 5 has a plane in which the plane lies parallel to the axial direction of the connecting end 21, and a plane and a connecting end 21 axially vertical storage state. Thus, when the adjustment handle 5 is required, the adjustment handle 5 is in the unfolded state. When the adjustment handle 5 is not required, the adjustment handle 5 is placed in the storage state.

This makes it easy for storage or carriage. Implementing the adjustment knob 5 There are many ways to switch between the two states.

For example, a locking structure is provided, in this embodiment, by adjusting the handle 5 and the extension 422. The hinge is provided with an interference fit so that the state of the adjustment knob 5 may be locked in real time. Referring to FIG. 1, the base in this embodiment is a multi-dimensional adjustment seat for adjusting the shooting equipment in the head mount with the mounting angle on the top. The multi-dimensional adjustment seat includes at least two rotating seats 31. When the rotating seats 31 and the rotating seats 31 are rotatably connected by the rotating shaft 32 and the number of the rotating shafts 32 is greater than 1, the rotating shafts 32 are not arranged in parallel. Specifically, in the embodiment, the multi-dimensional adjustment base includes three rotating seats 31, and the rotating seats 31 and the rotating seats 31 are rotatably connected by the rotating shaft 32, and the rotating shafts 32 are not arranged in parallel, wherein the brackets are close to each other. A base is attached to the bracket. As a variant, the multi-dimensional adjustment seat may also comprise two or four equal rotation seats 31.

Figure 7:
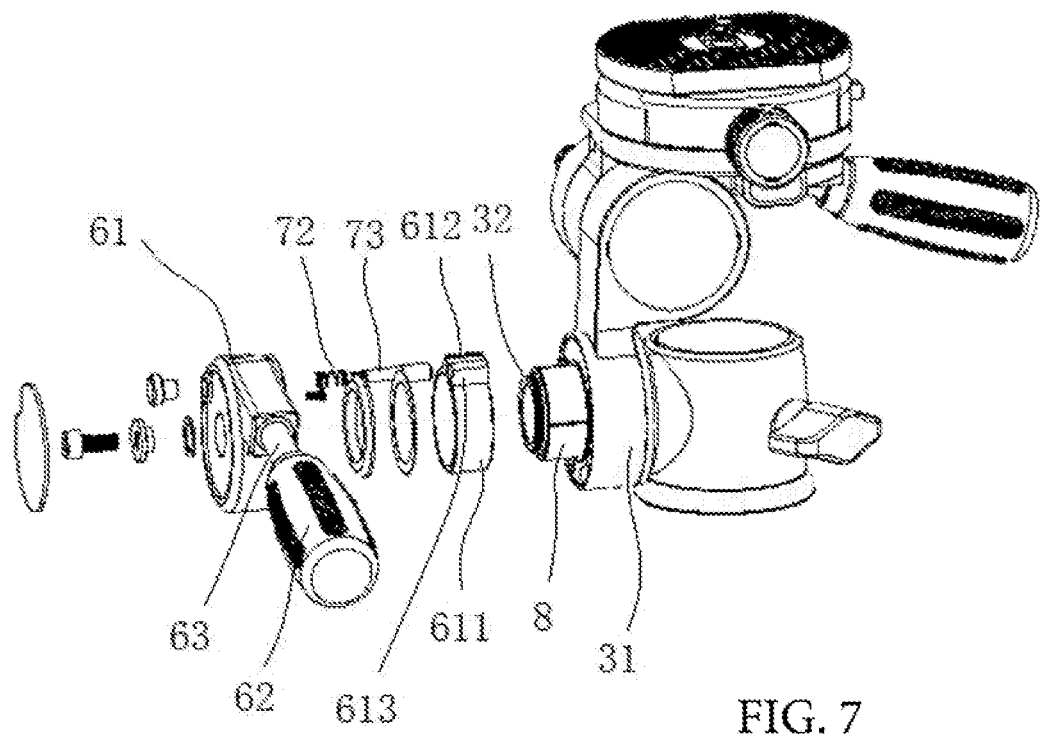
FIG. 7 is a partial exploded view of the head mount shown in FIG. 1.
Figure 8:
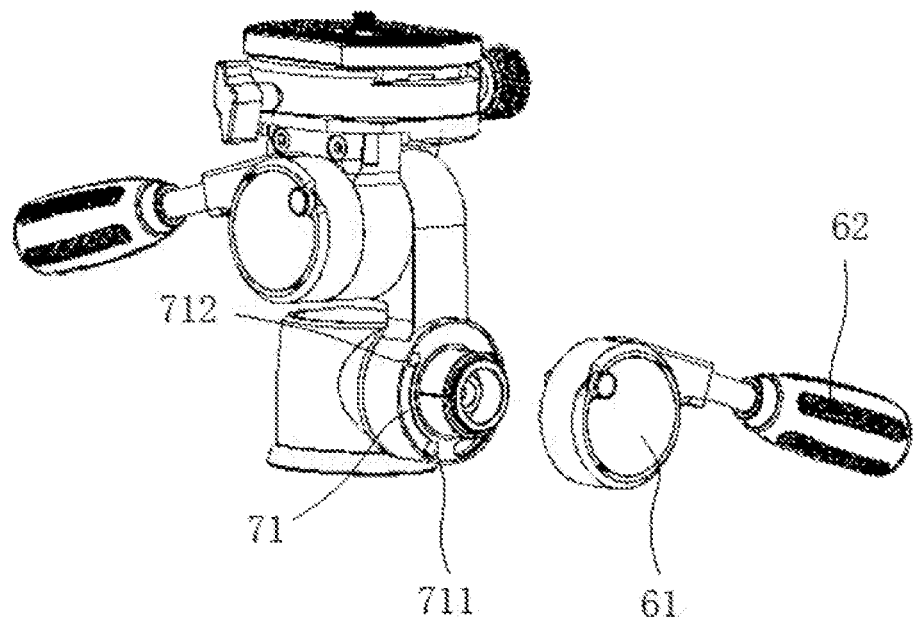
FIG. 8 is a schematic view showing the separation state of the first locking structure of the head mount and the other parts of the head mount shown in FIG. 1.
Figure 9:
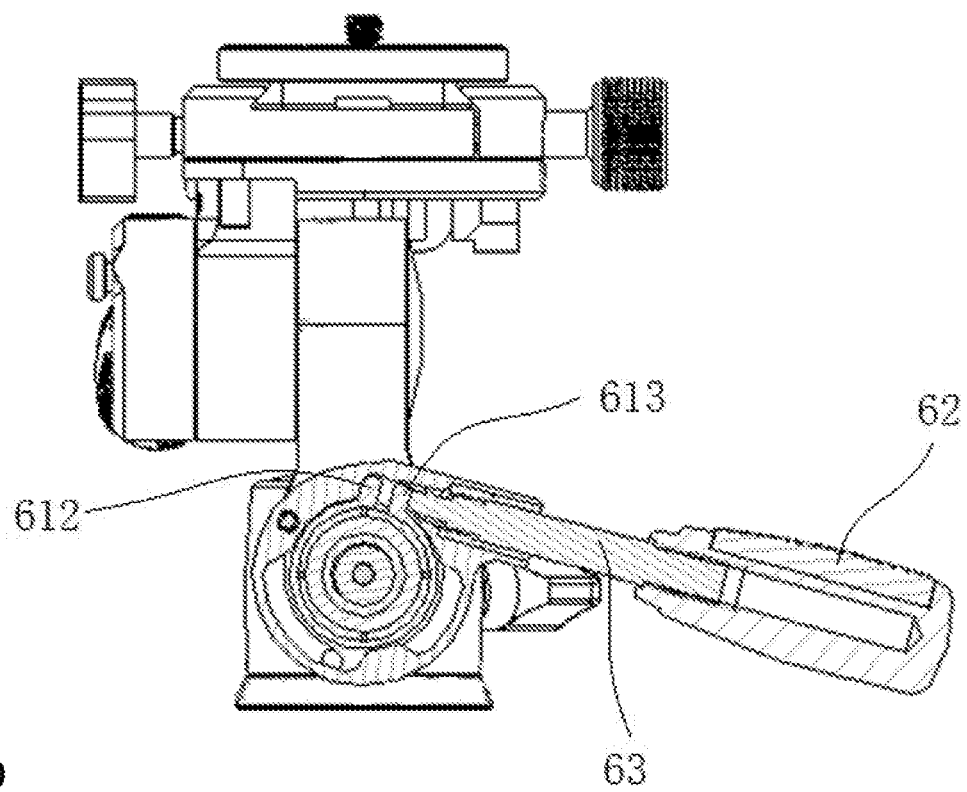
FIG. 9 is a partial cross-sectional view of the head mount shown in FIG. 1.

As shown in FIG. 7 to FIG. 9, the head mount in this embodiment further includes a rotatable setting about the rotation axis 32.

A first locking structure is disposed between the adjacent two rotating seats 31 being adjacent to the two rotating seats 31 locked at the adjusted angle. The first locking structure includes a locking assembly 61 and a locking handle 62. The lock assembly 61 is disposed on one of the rotating seats 31 of the adjacent two rotating seats 31 for locking the rotating shaft 32 to prevent rotation between the adjacent two rotating seats 31.

The locking handle 62 cooperates with the locking assembly 61 for controlling the locking assembly 61 to lock the rotating shaft 32 or unlock the rotary axis 32.

Figure 10:
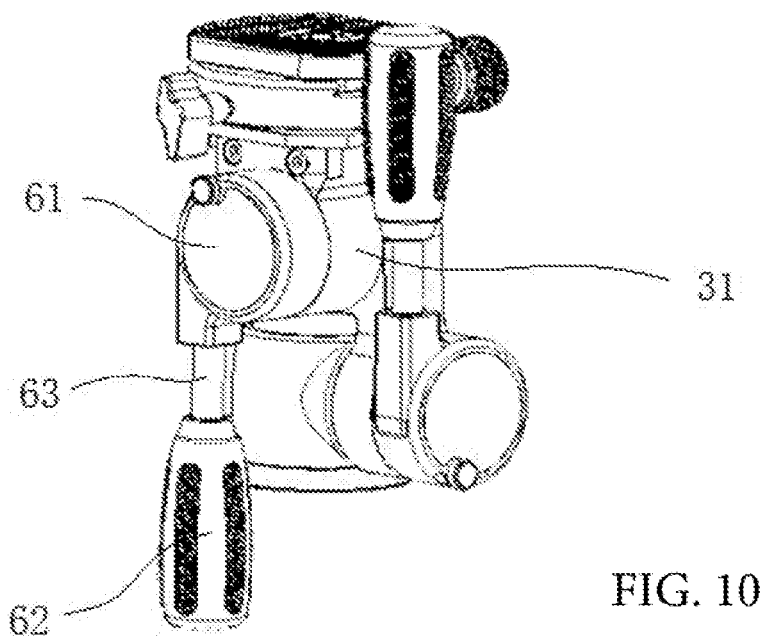
FIG. 10 is a perspective view showing the locking handle in the head mount shown in FIG. 1 in a vertical state.

Referring to FIG. 10, the head mount in this embodiment further includes a first locking structure about the rotating shaft 32.

The head mount rotates to lock handle 62 when in vertical position, and rotate around rotary axis 32 to work. In the state, the second locking structure is locked separately. The lock may be made by the setting of the second locking structure The handle 62 is switched and locked between the vertical state and the working state, thereby facilitating the locking.

The use of the handle 62 and the ease of storage when not in use reduce the space occupied by the head mount. As a variant, the second locking structure may not be provided.

The specific structure of the second locking structure may be various. In the embodiment, the second locking structure includes an curved groove 71, a positioning hole, an elastic member 72 and an adjustment member 73.

The curved groove 71 is provided on the end surface of the lock assembly 61 provided with the lock assembly 61 toward the end surface of the lock assembly 61, and is provided with a first position 711 and a second position 712.

The positioning holes are provided on the end faces of the locking assembly 61 facing the corresponding curved grooves 71.

The elastic member 72 is mounted in the positioning hole. The adjustment member 73 is opposite to one end of the elastic member 72 and may be inserted or removed by the elastic member 72.

The first position 711 and the second position 712, the adjustment member 73 is engaged in the first position 711 when the first locking structure is in a vertical state, when the first locking structure is in the working state In the second position 712.

By switching the adjustment member 73 between the first position 711 and the second position 712, it is possible to achieve having the locking handle 62 switched between the vertical state and the working state, and the manner of realizing the switching state of the locking handle 62 is simple and convenient to operate.

In the present embodiment, the first position 711 and the second position 712 are respectively locking holes which are recessed by the groove bottom of the curved groove 71.

One of the at least two rotating seats 31 is formed with a through hole and the other is turned. The movable seat 31 is provided with a rotating shaft 32 adapted to pass through the through hole; the locking assembly 61 is rotatably connected.

The rotating seats 31 of the through hole is provided, and the locking assembly 61 is provided with a mounting hole that may be fitted on the rotating shaft 32.

The locking assembly 61 further includes an open sleeve 611 sleeved on the rotating shaft 32, and is disposed in the mounting hole.

The opening sleeve 611 has two sides of the opening extending outwardly from the first adjustment arm 612 and the second adjustment arm 613; the first locking structure further includes a shaft 63 connecting the locking assembly 61 and the locking handle 62. The locking assembly 61 is provided with a threaded connection, and the corresponding end of the shaft 63 is provided with a screwing hole as the threaded structure. The shaft 63 pushes against the first adjustment arm 612 to the second when screwing or unscrewing the threaded connection.

The adjustment arm 613 is brought closer to the reduced opening or away from the first adjustment arm 612 to gradually enlarge the opening.

By opening the shaft 32, the opening of the opening sleeve 611 may be adjusted, thereby opening the sleeve 611.

Rotating or holding the rotating shaft 32 with respect to the rotating shaft 32, so that the opening bushing 611 may be rotated relative to the rotating shaft 32.

When the rotating shaft 32 rotates, the angle between the rotating seats 31 and the state of the locking handle 62 are switched.

The angle or state is adjusted when the open sleeve 611 holds the rotary shaft 32. The head mount of this embodiment further includes an elastic sleeve 8 disposed on the rotating shaft 32 and the opening between the bushings 611. The elastic bushing 8 locks the rotating shaft 32 when the opening of the split bushing 611 contracts. As an alternative embodiment, the elastic bushing 8 may not be provided.

In the head mount in this embodiment, when the interface of the photographing device to be installed corresponds to the ⅜ UNC screw end, the ¼ UNC screw end is pressed down, so that the shaft body 23 is turned around the hinge shaft 22 in the mounting cavity 1 to The ¼UNC screw end extends into the mounting cavity 1 and the ⅜UNC screw end is turned out of the mounting cavity 1; when the interface of the shooting device to be mounted corresponds to the ¼UNC screw end, the same reason, press ⅜ UNC Screw end, so that the shaft body 23 is turned around the hinge shaft 22 in the mounting cavity 1 to the ⅜ UNC screw end extend into the mounting cavity 1 and the ¼ UNC screw end is turned out of the mounting cavity 1 so that it may be used according to the requirements.

Convert the required connection 21 to the mounting pocket 1 and connect it to the corresponding shooting device. Aspects of the invention only needs flip the conversion structure to enable conversion of different connectors 21, enabling shooting with different interfaces The connection of the device is simple and quick, and the connection end 21 is not required to be disassembled, which is not easy to cause the connection end 21 lost.

It is apparent that the above-described embodiments are merely illustrative of the examples and are not intended to limit the implementation. Other variations or modifications of the various forms may be made by those skilled in the art in light of the above description. There is no need and no way to exhaust all of the implementations. Obvious changes or variations resulting therefrom are still within the protection of the invention.

What is claimed is:

1. A head mount comprising:
a seat body having a mounting cavity (1) thereon; a conversion structure having at least two connection ends (21) of different specifications;
one of the connecting ends (21) protrudes out of the mounting cavity (1) by flipping the conversion structure, and is adapted to be connected to a photographing device, and the seat body includes a limit structure for preventing a switching mechanism from being turned over after the photographing device is connected to the connecting end (21), wherein the conversion structure is hinged in the mounting cavity (1);
wherein a cavity wall of the mounting cavity (1) has oppositely disposed restricted opening (11), and the conversion structure further comprises:
a hinge shaft (22) is respectively inserted into the corresponding limiting opening (11);
a rotating shaft body (23), the two connecting ends (21) are respectively fixed on two sides thereof; the rotating shaft body (23) provided therethrough for the hinge shaft (22) to pass through and the hinge body (23) may be hinged around the hinge.

2. The head mount according to claim 1, wherein the limiting structure is a limiting end surface (24) on the seat body, and the mounting cavity (1) is formed on the limit end surface (24), the limit end surface (24) is opposed to the bottom of the photographing device to prevent the switching mechanism from being reversed.

3. The head mount according to claim 1, wherein the at least two connecting ends (21) of the conversion structure are a ⅜ UNC screw end and a ¼ UNC screw end, respectively.

4. The head mount according to claim 1, wherein the seat body comprises:
a base adapted to be coupled to a bracket; a quick-loading plate assembly (4) mounted on the base, and the mounting cavity (1) is mounted away from one end of the base.

5. The head mount according to claim 4, wherein the quick-loading plate assembly (4) comprises:
a quick loading plate (41), comprising a plate-shaped body (411), and an extending arm (412) extending from the plate-shaped body (411) away from the photographing device; the plate-shaped body (411) comprises a first receiving cavity (413), and the protruding arm (412) and the plate-shaped body (411) form a second accommodating cavity (414) in communication with the first receiving cavity (413);
a fixing seat (42) includes an insertion portion (421) installed in the first receiving cavity (413) having the mounting cavity (1);
a cover plate (43) is disposed in the second accommodating cavity (414), detachably connected to a side of the plate-shaped body (411) away from the photographing device, and one side of the insertion portion (421) being away from the photographing device is disposed to prevent the insertion portion (421) from coming out of the first receiving cavity (413) and away from the photographing device.

6. The head mount according to claim 5, wherein an outer diameter of the first receiving cavity (413) near the bottom of the photographing device is smaller than an outer diameter of an opposing end of the first receiving cavity (413) away from the photographing device, and an outer peripheral wall of the insertion portion (421) matches a wall of a chamber of the first receiving cavity (413).

7. The head mount according to claim 5, wherein the fixing seat (42) comprises a protrusion (422) extendingly coupled to the insertion portion (421) and extending into the second accommodating cavity (414), wherein the protrusion (422) and an adjustment structure (5) are configured for rotating the shaft around an axis of the connection end (21).

8. The head mount according to claim 7, wherein the adjustment handle (5) is hinged to the protrusion (422), and the adjustment handle (5) comprises a plane, wherein the adjustment handle (5) comprise an unfolded state and a storage state, wherein the plane is disposed in parallel to an axial direction of the connecting end (21) in the unfolded state and the plane is disposed in perpendicular to the axial direction of the connecting end (21) in the storage state.

9. The head mount according to claim 4, wherein the base is a multi-dimensional adjustment seat for adjusting an installation angle of the photographing device on the head mount.

10. The head mount according to claim 9, wherein the multi-dimensional adjustment seat comprises at least two rotating seats (31), the at least two rotating seats (31) are rotatably connected by one or more rotating shafts (32), the one or more rotating shafts (32) are not arranged in parallel; and
wherein the head mount further includes a first locking structure disposed between two adjacent rotating seats (31) for locking the two adjacent rotating seats (31) at an adjusted angle.

11. The head mount according to claim 10, wherein the first locking structure comprises:
a locking assembly (61) disposed on one of the at least two rotating seats (31) for locking the rotating shaft (32) to prevent two adjacent rotating seats (31) from rotating therebetween; a locking handle (62) that cooperates with the locking assembly (61) for controlling the locking assembly (61) to lock the rotating shaft (32) or to unlock the rotating shaft (32).

12. The head mount according to claim 11, wherein the first locking structure is rotatably disposed around the rotating shaft (32).

13. The head mount of claim 12, a second locking structure, the second locking structure comprises:
an curved groove (71) disposed on an end surface of the locking assembly (61) and provided with a first position (711) and a second position (712);
an elastic member (72);
an adjustment member (73) is disposed opposite to one end of the elastic member (72), and engages the elastic member (72) between the first position (711) and the second position (712), and the adjustment member (73) is engaged in the first locking structure when the first locking structure is in a vertical state in the first position (711); wherein the adjustment member (73) is engaged in the second position (712) when the first locking structure is in an operational state.

14. The head mount according to claim 13, wherein the first position (711) and the second position (712) is respectively locked by a bottom of the curved groove (71).

15. The head mount according to claim 10, wherein one of the rotating seats (31) of two mating seats (31) is formed with a through opening, and another of the rotating seats (31) is provided with the rotating shaft (32) adapted to pass through the through opening; the locking assembly (61) is rotatably coupled to the rotating seat provided with the through opening (31) above, and the locking assembly (61) is provided with a mounting opening that may be fitted on the rotating shaft (32).

16. The head mount according to claim 15, wherein the locking assembly (61) further comprises an opening sleeve (611) sleeved on the rotating shaft (32), provided in the mounting opening, the opening sleeve (611) has two sides extending outwardly from a first regulating arm (612) and a second regulating arm (613);
wherein the first locking structure further includes a shaft (63) connecting the locking assembly (61) and the locking handle (62);
the locking assembly (61) is provided with a threaded connection, a corresponding end of the shaft (63) is provided with an externally threaded structure that cooperates with the threaded connection;
the shaft (63) moves along the threaded connection to push against the first regulating arm (612) toward the second regulating arm (613) or to pull away from the first regulating arm (613) and the away from the second regulating arm (613).

17. The head mount according to claim 16, further comprising an elastic sleeve (8), said elastic sleeve (8) being provided between the rotating shaft (32) and the opening sleeve (611), wherein the elastic sleeve (8) locks the rotating shaft when the opening of the opening sleeve (611) contracts.

18. A head mount comprising:
a seat body having a mounting cavity (1) thereon; a conversion structure having at least two connection ends (21) of different specifications;
one of the connecting ends (21) protrudes out of the mounting cavity (1) by flipping the conversion structure, and is adapted to be connected to a photographing device, and the seat body includes a limit structure for preventing a switching mechanism from being turned over after the photographing device is connected to the connecting end (21),
wherein the seat body comprises:
a base adapted to be coupled to a bracket; a quick-loading plate assembly (4) mounted on the base, and the mounting cavity (1) is mounted away from one end of the base;
wherein the quick-loading plate assembly (4) comprises:
a quick loading plate (41), comprising a plate-shaped body (411), and an extending arm (412) extending from the plate-shaped body (411) away from the photographing device; the plate-shaped body (411) comprises a first receiving cavity (413) and the protruding arm (412) and the plate-shaped body (411) form a second accommodating cavity (414) in communication with the first receiving cavity (413); a fixing seat (42) includes an insertion portion (421) installed in the first receiving cavity (413), and has a mounting cavity (1);
a cover plate (43) is disposed in the second accommodating cavity (414), detachably connected to a side of the plate-shaped body (411) away from the photographing device, and one side of the insertion portion (421) being away from the photographing device is disposed to prevent the insertion portion (421) from coming out of the first receiving cavity (413) away from the photographing device;
wherein an outer diameter of the first receiving cavity (413) near one end of the photographing device is smaller than an outer diameter of an opposing end of the first receiving cavity (413) away from the photographing device, and an outer peripheral wall of the insertion portion (421) matches a wall of a chamber of the first receiving cavity (413); and
wherein the fixing seat (42) comprises a protrusion (422) extendingly coupled to the insertion portion (421) and extending into the second accommodating cavity (414), wherein the protrusion (422) and an adjustment structure (5) are configured for rotating the shaft around the axis of the connection end (21).

* * * * *